Dec. 20, 1960     T. H. LINDBOM     2,965,118

FLUID PRESSURE RATIO CONTROL DEVICE

Filed April 29, 1955

INVENTOR.
TORSTEN H. LINDBOM
BY
his ATTORNEYS.

United States Patent Office 2,965,118
Patented Dec. 20, 1960

2,965,118

FLUID PRESSURE RATIO CONTROL DEVICE

Torsten H. Lindbom, Northport, N.Y., assignor to Fairchild Engine and Airplane Corporation, Hagerstown, Md., a corporation of Maryland Filed Apr. 29, 1955, Ser. No. 504,869

10 Claims. (Cl. 137—85)

The present invention relates to fluid pressure control systems and, more particularly, to novel and improved apparatus for controlling the ratio of two absolute pressures.

In the operation of jet engines, it is desirable to maintain the ratio between the discharge pressure of the compressor to the discharge pressure of the turbine substantially constant for the various powers developed by the engine. In order to accomplish this condition, either the amount of fuel delivered to the afterburner chamber may be adjusted, or the area of the final nozzle may be adjusted. These adjustments may be made by controlling the movement of a rod connected either directly or by a booster mechanism, to the afterburner fuel valve or to a lever the movement of which varies the area of the final nozzle.

It is an object of the invention to provide novel and improved fluid pressure ratio control mechanism for regulating the movement of a control rod such as described above to maintain the ratio of two absolute pressures substantially constant.

In accordance with the invention, a pressure ratio control unit may include a housing which is divided into three sections by two flexible diaphragms. A control rod for controlling a variable element of the system is directly coupled to the two diaphragms and its position is a function of the opposing pressures on each side of each of the two diaphragms. The pressures in two of the chambers are proportionate to the two absolute pressures in the system, the ratio of which is to be controlled, and the pressure in the third chamber is regulated as a function of the position of the controlled rod.

A more complete understanding of the invention may be had by reference to the following detailed description taken in conjunction with the accompanying figures of the drawing, in which.

Figure 1:
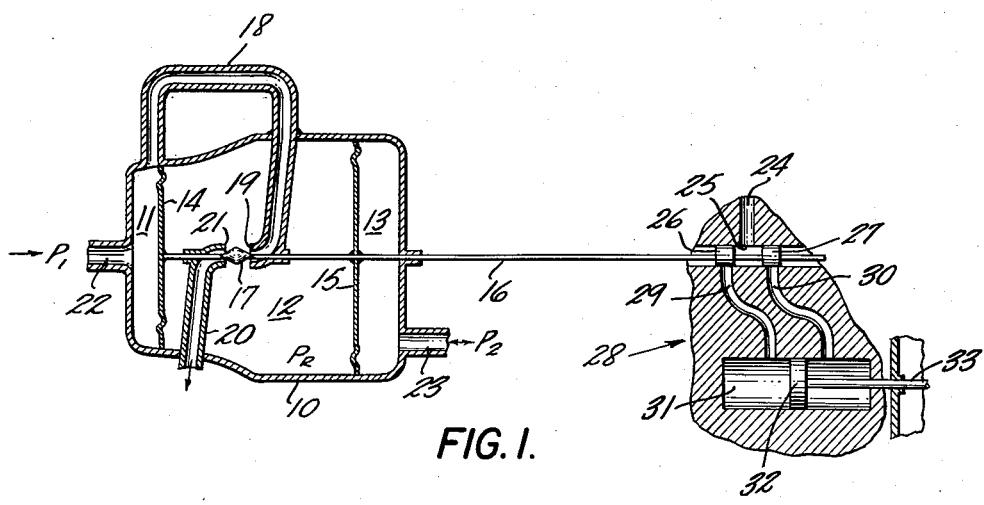
Figure 1 is a schematic diagram of a pressure ratio controller including a control rod operating a booster mechanism, in accordance with the invention.

Referring now to Fig. 1, the exemplary form of pressure ratio controller shown therein includes a housing 10 which is divided into three separate chambers 11, 12 and 13 by means of diaphragms 14 and 15, having effective areas A and B, respectively.

An actuating means or control rod 16, which is mounted for movement within the housing 10 of the pressure ratio controller is fixedly attached to both the diaphragms 14 and 15. A double faced valve pintle 17 is mounted on the control rod 16, intermediate the diaphragms 14 and 15.

The chamber 11 is connected to the chamber 12 by means of a conduit 18 having an orifice 19 in the chamber 12 which is adapted to receive one face of the valve pintle 17. Another conduit 20 leads from the chamber 12 to the atmosphere and has an orifice 21 in the chamber 12, which is adapted to receive the other face of the valve pintle 17. Any longitudinal movement of the rod 16 and the valve pintle 17 causes the effective area X of the orifice 19 and the effective area Y of the orifice 21 to be varied.

A first source of pressure $P_1$ is connected to the chamber 11 by means of a conduit 22 and the chamber 13 is connected to a second source of pressure $P_2$ by means of another conduit 23. A regulated pressure $P_R$ is created in the chamber 12 by the control of the effective areas X and Y.

The control rod 16 may operate any suitable control mechanism which is adaptable to be operated by the longitudinal displacement of the rod 16. For example, the control mechanism may be a droop-free servo type booster unit, such as that shown generally as unit 28.

The booster unit 28 may be connected to an auxiliary source of fluid pressure through a passage 24 which terminates in a valve chest 25. Valve blocks 26 and 27 selectively cut off or connect the valve chest 25 to the passages 29 and 30, respectively, that lead to an auxiliary booster cylinder 31. A piston 32 is mounted on a rod 33 which is adapted to slip within the booster cylinder 31. The rod 33 is connected to the unit which is to be controlled, for example, either the afterburner fuel control valve of a jet engine or the final nozzle area operating lever.

In a typical practical embodiment of the pressure ratio control unit, the conduit 22 may be connected to a point in the system which is at the turbine discharge pressure, thereby making the pressure $P_1$ equal to the turbine discharge pressure. The conduit 23 may be connected to a point in the system which is at the compressor discharge pressure, thereby causing the pressure $P_2$ to be equal to the compressor discharge pressure.

In operation, the pressure $P_1$ in the chamber 11 acts against the diaphragm 14 and produces a force acting on the control rod 16, which is proportional to $P_1 A$.

Similarly, the pressure $P_2$ acts against the diaphragm 15 and produces a force acting on the control rod 16, which is proportional to $P_2 B$. The force $P_2 B$ on the diaphragm 15 is in opposition to the force $P_1 A$ on the diaphragm 14.

The turbine discharge fluid from the chamber 11 also passes through the conduit 18 and the orifice 19 into the chamber 12 under the control of the valve pintle 17. Fluid in the chamber 12 is exhausted to the atmosphere through the conduit 20 and the orifice 21, also under the control of the valve pintle 17. Thus a regulated pressure $P_R$ is established in the chamber 12, which acts against both of the diaphragms 14 and 15.

The pressure ratio controller will be in equilibrium when the following relation obtains:

$$(P_1 - P_R)A = (P_2 - P_R)B \qquad (1)$$

In the preferred embodiment, it shall be assumed that the pressure ratios across each of the orifices 19 and 21 are supercritical. Therefore, the flow through each of these orifices is proportional to the effective area of the orifice, the flow coefficient M, which is constant for sonic flow, the coefficient of discharge D for the particular orifice, and the upstream pressure, and inversely proportional to the square root of the temperature T:

$$\text{Flow} = \frac{MD_x P_1 X}{\sqrt{T_1}} = \frac{MD_Y P_R Y}{\sqrt{T_R}} \qquad (2)$$

Therefore, $$P_R = \left(\frac{XD_X}{XD_Y}\right)P_1 \quad (3)$$

$$= CP_1 \quad (4)$$

where C is a dependent variable, the value of which is dependent upon the valve position. Since the booster unit 28 is a droop-free servo, i.e., a servo which has a fixed equilibrium position independent of the operating conditions of the system, the equilibrium position of the rod 16 is always the same value and C will always be the same under different operating conditions.

In order to determine the value of the pressure ratio $P_1:P_2$, in this system, the value of $P_R$, as shown by relation (4), is substituted in the relation (1):

$$(P_1 - CP_1)A = (P_2 - CP_1)B \quad (5)$$

or $$P_1(A - CA + CB) = P_2B \quad (6)$$

and $$\frac{P_1}{P_2} = \frac{B}{A - CA + CB} \quad (7)$$

Since A and B are constants, and C has a fixed value at equilibrium, it is seen that the ratio $P_1:P_2$ is equal to a constant when the pressure ratio controller is in its equilibrium position.

Figure 2:
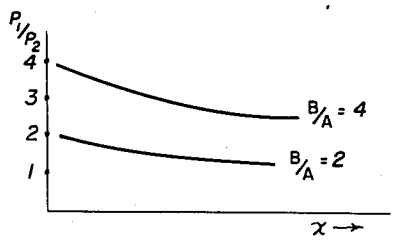
Fig. 2 is a set of response curves for the pressure ratio control unit of Fig. 1 showing plots of pressure ratios against control rod displacements with different pairs of diaphragms having relative sizes in different proportions.

The response curves of Fig. 2, representative of typical operating characteristics of the pressure ratio controller of Fig. 1, show a favorable sensitivity characteristic due to a great percentage of the pressure ratio being sensed by the area ratio $B/A$ between the two diaphragms 15 and 14. The control rod displacement $x$ is varied over a range including the equilibrium point of the pressure ratio controller. Ideally the family of response curve should be horizontal lines. However, as seen from the relatively flat characteristic of the curves, the unit during operation is not overly sensitive to the reference pressure $P_R$ created by the valve mechanism as it seeks the point of equilibrium. Therefore, dirt particles in the orifices and variations in Reynolds number normally do not seriously influence the output signal of the pressure ratio controller.

Figure 3:
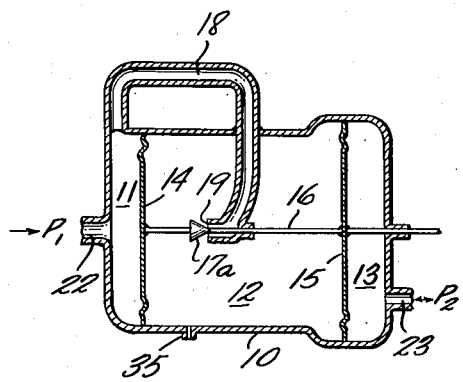
Fig. 3 is a schematic diaphragm of another embodiment of a pressure ratio controller, in accordance with the invention.

In the embodiment of Fig. 3, a single faced valve pintle 17a adapted to be received by the orifice 19, is utilized. In place of the variable area orifice 21 in Fig. 1, a fixed restriction 35 is used to vent the chamber 12 to the atmosphere. Therefore, the effective area Y in relations (2) and (3) is a predetermined constant, while the effective area X for the orifice 19 is still a dependent variable, which is a function of the position of the control rod 16. Otherwise, the system operates in the same manner as that of Fig. 1.

Figure 4:
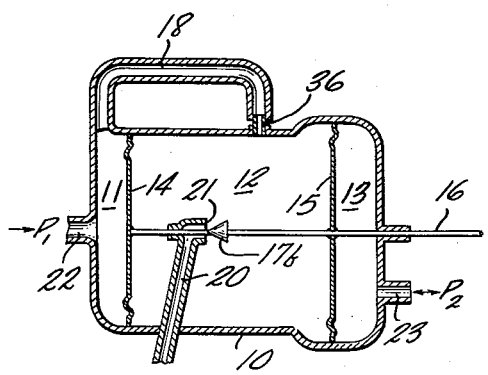
Fig. 4 is a schematic diagram showing a still further embodiment of a pressure ratio controller, in accordance with the invention.

In the embodiment of Fig. 4, a single faced valve pintle 17b is used in conjunction with the orifice 21 to provide the variable effective area Y for the orifice 21, and a fixed restriction 36 is substituted for the variable area orifice 19, whereby making X a predetermined constant. Similarly to the system of Fig. 3, the additional embodiment of Fig. 4 functions in the same manner as that of Fig. 1.

In certain applications of the principles of the invention, it is not necessary to maintain critical pressure ratios across the orifices 19 and 21. For example, in an afterburner control system for a jet engine, the ratio between the temperature upstream of the jet nozzle in the afterburner combustion chamber and the temperature upstream of the turbine may be controlled by sensing the pressures upstream of the turbine nozzle and upstream of the jet nozzle. The characteristics of these nozzles at subcritical pressure ratios will then be the same as those of the orifices 19 and 21, and any errors in the system will be compensated.

Thus there has been provided, in accordance with the invention, a novel and improved pressure ratio control mechanism having a substantially lower sensitivity to the reference pressure created by the mechanism, than that available in previously known ratio controllers.

While the above exemplary embodiments have been used to describe the invention, it will be obvious to those skilled in the art that the embodiments are susceptible of substantial modification and variation within the spirit and scope of the invention. Accordingly, the invention is not deemed to be limited except as defined by the following claims.

I claim:

1. In a fluid pressure system having two fluid pressures the ratio of which is to be controlled and movable actuating means for varying at least one of the two pressures, the combination therewith of fluid pressure control mechanism, comprising differential pressure responsive means for controlling the movement of said actuating means including a plurality of contiguous chambers separated by flexible diaphragms and adapted to contain fluids at different pressures, a first one of said chambers containing fluid at one of said two pressures, a second one of said chambers containing fluid at the other of said two pressures, and means in communication with the fluid in said first chamber for producing a regulated pressure in a third one of said chambers intermediate said first and second chambers and separated therefrom by said flexible diaphragms that is a function of the position of said actuating means.

2. In a fluid pressure system having two fluid pressures the ratio of which is to be controlled and movable actuating means for varying at least one of the two pressures, the combination therewith of fluid pressure control mechanism, comprising a first chamber having fluid at one of said two pressures, a second chamber having fluid at the other of said two pressures, a third chamber positioned intermediate said first and second chambers, diaphragm means separating said third chamber from said first and second chambers, respectively, said diaphragm means controlling the movement of said actuating means, variable restrictive means connecting said first and third chambers for fluid flow therebetween for producing a regulated pressure in said third chamber that is a function of the position of said actuating means.

3. In a fluid pressure system having two fluid pressures the ratio of which is to be controlled and actuating means for varying at least one of the two pressures, the combination therewith of fluid pressure control mechanism, comprising a movable control rod for controlling said actuating means, a first chamber containing fluid at one of said two pressures, a second chamber containing fluid at the other of said two pressures, a third chamber positioned intermediate said first and second chambers, first and second diaphragm means for separating said first and third chambers and said second and third chambers, respectively, said first and second diaphragm means being connected to said control rod, and variable restrictive means connecting said first and third chambers for fluid flow therebetween for producing a regulated pressure in said third chamber that is a function of the position of said control rod.

4. In a fluid pressure system having two fluid pressures the ratio of which is to be controlled and actuating means for varying at least one of the two pressures, the combination therewith of fluid pressure control mechanism, comprising a movable control rod for controlling said actuating means, a first chamber containing fluid at one of said two pressures, a second chamber containing fluid at the other of said two pressures, a third chamber positioned intermediate said first and second chambers and connected to said first chamber and to the atmosphere, first and second diaphragm means fixedly connected to said control rod and separating said first and third chambers and said second and third chambers, respectively, and variable restrictive means for controlling the flow of fluid from said first chamber into said third chamber and to the atmosphere so as to produce a regulated pressure in said third chamber that is a function of the position of the control rod.

5. In a fluid pressure system having two fluid pressures the ratio of which is to be controlled and actuating means for varying at least one of the two pressures, the combination therewith of fluid pressure control mechanism, comprising a movable control rod for controlling said actuating means, a first chamber containing fluid at one of said two pressures, a second chamber containing fluid at the other of said two pressures, a third chamber positioned intermediate said first and second chambers and connected to said first chamber and to the atmosphere, first and second diaphragm means separating said first and third chambers and said second and third chambers, respectively, said first and second diaphragm means being fixedly connected to said control rod at longitudinally spaced apart points, and variable restrictive means including a valve pintle mounted on said control rod for controlling the flow of fluid from said first chamber to said third chamber and to the atmosphere.

6. In a fluid pressure system having two fluid pressures the ratio of which is to be controlled and actuating means for varying at least one of the two pressures, the combination therewith of fluid pressure control mechanism, comprising a movable control rod for controlling said actuating means, a first chamber containing fluid at one of said two pressures, a second chamber containing fluid at the other of said two pressures, a third chamber positioned intermediate said first and second chambers, first and second diaphragm means separating said first and third chambers and said second and third chambers, respectively, said first and second diaphragm means being fixedly connected to said control rod at longitudinally spaced apart points, first fluid restrictive means connecting said first and third chambers to permit the flow of fluid from said first chamber to said third chamber, second fluid restrictive means connecting said third chamber to the atmosphere, and means coupled to said control rod for varying at least one of said first and second fluid restrictive means.

7. In a fluid pressure system having two fluid pressures the ratio of which is to be controlled and actuating means for varying at least one of the two pressures, the combination therewith of fluid pressure control mechanism, comprising a movable control rod for controlling said actuating means, a first chamber containing fluid at one of said two pressures, a second chamber containing fluid at the other of said two pressures, a third chamber positioned intermediate said first and second chambers, first and second diaphragm means separating said first and third chambers and said second and third chambers, respectively, said first and second diaphragm means being fixedly connected at longitudinally spaced apart points along said control rod, first fluid conducting means connecting said first and third chambers and having a control orifice opening into said third chamber, second fluid conducting means connecting said third chamber to the atmosphere and having a control orifice, and means mounted on said control rod for varying the effective area of at least one of said control orifices in said first and second fluid conducting means.

8. In a fluid pressure system having two fluid pressures the ratio of which is to be controlled and actuating means for varying at least one of the two pressures, the combination therewith of fluid pressure control mechanism, comprising a movable control rod for controlling said actuating means, a first chamber containing fluid at one of said two pressures, a second chamber containing fluid at the other of said two pressures, a third chamber positioned intermediate said first and second chambers, first and second diaphragm means separating said first and third chambers and said second and third chambers, respectively, said first and second diaphragm means being fixedly connected to said control rod at longitudinally spaced apart points, first fluid conducting means connecting said first and third chambers and having a control orifice opening into said third chamber, second fluid conducting means connecting said third chamber to the atmosphere and having a control orifice therein, and means connected to said control rod for varying the effective areas of said control orifices in said first and second fluid conducting means, thereby producing a regulated pressure that is a function of the position of the control rod.

9. In a fluid pressure system having two fluid pressures the ratio of which is to be controlled and actuating means for varying at least one of the two pressures, the combination therewith of fluid pressure control mechanism, comprising a movable control rod for controlling said actuating means, a first chamber containing fluid at one of said two pressures, a second chamber containing fluid at the other of said two pressures, a third chamber positioned intermediate said first and second chambers, first and second diaphragm means separating said first and third chambers and said second and third chambers, respectively, said first and second diaphragm means being fixedly connected to the control rod at longitudinally spaced apart points, first fluid conducting means connecting said first and third chambers and having a control orifice opening into said third chamber, means connected to said control rod for varying the effective area of said control orifice, and second fluid conducting means connecting said third chamber to said atmosphere and having a fixed restriction therein.

10. In a fluid pressure system having two fluid pressures the ratio of which is to be controlled and actuating means for varying at least one of the two pressures, the combination therewith of fluid pressure control mechanism, comprising a movable control rod for controlling said actuating means, a first chamber containing fluid at one of said two pressures, a second chamber containing fluid at the other of said two pressures, a third chamber positioned intermediate said first and second chambers, first and second diaphragm means separating said first and third chambers and said second and third chambers, respectively, said first and second diaphragm means being fixedly connected to said control rod at longitudinally spaced apart points, first fluid conducting means connecting said first chamber and said third chamber and having a fixed restriction therein, second fluid conducting means connecting said third chamber to the atmosphere and having a control orifice opening into said third chamber, and means connected to said control rod for varying the effective area of said control orifice.

References Cited in the file of this patent

UNITED STATES PATENTS

| | | |
|---|---|---|
| 1,887,322 | Nettleton | Nov. 8, 1932 |
| 2,406,181 | Wiegand | Aug. 20, 1946 |
| 2,457,595 | Orr | Dec. 28, 1948 |
| 2,470,452 | Ackley | May 17, 1949 |
| 2,545,856 | Orr | Mar. 20, 1951 |
| 2,563,374 | Rosenberger | Aug. 7, 1951 |
| 2,584,455 | Hughes | Feb. 5, 1952 |
| 2,588,622 | Eckman | Mar. 11, 1952 |
| 2,638,919 | Clarridge | May 19, 1953 |
| 2,652,813 | Reuter et al. | Sept. 22, 1953 |
| 2,712,321 | Grogan | July 5, 1955 |
| 2,774,367 | Grogan | Dec. 18, 1956 |
| 2,796,136 | Mock | June 18, 1957 |

FOREIGN PATENTS

| | | |
|---|---|---|
| 736,003 | Great Britain | Aug. 31, 1955 |